US012706403B2

(12) United States Patent
Hou et al.

(10) Patent No.: US 12,706,403 B2
(45) Date of Patent: Aug. 11, 2026

(54) ELECTRONIC DEVICE WITH CONNECTION BETWEEN A SHIELD PART AND CONNECTING ELEMENT

(71) Applicant: VALEO COMFORT AND DRIVING ASSISTANCE, Créteil (FR)

(72) Inventors: Yingfan Hou, Creteil (FR); Jan Krikava, Creteil (FR); Robert Stedry, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 314 days.

(21) Appl. No.: 18/535,766

(22) Filed: Dec. 11, 2023

(65) Prior Publication Data

US 2024/0195095 A1 Jun. 13, 2024

(30) Foreign Application Priority Data

Dec. 12, 2022 (EP) .................................... 22212928

(51) Int. Cl.

*H01R 12/71* (2011.01)
*H01R 12/70* (2011.01)
*H01R 13/506* (2006.01)
*H01R 13/6582* (2011.01)

(52) U.S. Cl.

CPC ....... *H01R 12/716* (2013.01); *H01R 12/7023* (2013.01); *H01R 13/506* (2013.01); *H01R 13/6582* (2013.01)

(58) Field of Classification Search

CPC .............. H01R 12/716; H01R 12/7023; H01R 13/506; H01R 13/6582; H01R 13/6581; H01R 13/5213; H01R 13/658; H01R 13/6658; H01R 12/714; H01R 13/502; H05K 5/0069; H05K 9/0037

See application file for complete search history.

(56) References Cited

U.S. PATENT DOCUMENTS 5,253,143 A * 10/1993 Klinger ................ H05K 5/0247 361/744
7,149,089 B2 * 12/2006 Blasko ................. H01R 13/521 361/752
9,578,767 B2 * 2/2017 Gingrich, III ..... H01R 13/6581

* cited by examiner

*Primary Examiner* — Edwin A. Leon
(74) *Attorney, Agent, or Firm* — Osha Bergman Watanabe & Burton LLP

(57) ABSTRACT

An electronic device includes a casing that includes a first part and a second part. The electronic device also includes a shield part as well as a printed circuit board that is placed between the shield part and the first part of the casing. The electronic device also includes at least one connecting element that is connected to the printed circuit board. The connecting element includes a connecting head that cooperates with a complementary fastener that is formed on the shield part so that the connecting element is fixed on the shield part.

7 Claims, 2 Drawing Sheets

ELECTRONIC DEVICE WITH CONNECTION BETWEEN A SHIELD PART AND CONNECTING ELEMENT

TECHNICAL FIELD

The invention belongs to the technical field of electronic devices.

It relates specially to electronic devices used in automotive vehicles, for example systems used to monitor the driver behaviour in the passenger compartment.

More particularly, the invention relates to an electronic device comprising:

- a casing comprising a first part and a second part,
- a shield part,
- a printed circuit board placed between the shield part and the first part of the casing, and
- at least one connecting element connected to the printed circuit board.

TECHNOLOGICAL BACKGROUND

Driver monitoring systems are being used more and more frequently in the passenger compartment of automotive vehicles in order to monitor the driver and his/her driving behaviour.

Such systems generally comprise a printed circuit board equipped with an image capture unit and an illumination device. The acquired data are then transmitted to a control unit associated with the vehicle.

The printed circuit board is connected to this control unit by means of a connecting element. This connecting element is directly fixed to the printed circuit board in order to establish this connection.

However, this arrangement weakens the printed circuit board as mechanical efforts of the fixing are applied directly on the printed circuit board. The printed circuit board may thus be damaged more quickly.

SUMMARY OF THE INVENTION

The invention proposes to improve the connection of the printed circuit board in order to limit the mechanical efforts applied on this one.

More particularly, the invention relates to an electronic device as defined in the introduction and in which the connecting element comprises a connecting head cooperating with a complementary fastening means formed on the shield part, in such a way that the connecting element is fixed on said shield part.

Thanks to the invention, the mechanical fixing of the connecting element is carried out on the shield part, and not directly on the printed circuit board. The mechanical stresses are thus exerted on the shield part, so as not to weaken the printed circuit board.

Other advantageous features of the electronic device are the following ones:

- the connecting element is fixed by a snap-in cooperation to the complementary fastening means;
- the complementary fastening means comprises a protruding part protruding from a surface of the shield part, said protruding part comprising an opening;
- the connecting head of the connecting element comprises a tab configured to be inserted in the opening of the protruding part of the complementary fastening means in order to fix the connecting element on the shield part;
- the shield part comprises a connecting opening configured to connect the connecting element to a connector part of the printed circuit board, said connector part extending through said connecting opening and allowing the connection to the connecting element;
- the shield part and the printed circuit board are screwed to the first part of the casing;
- the second part of the casing is clipped on the first part of the casing in such a way that the casing houses the shield part and the printed circuit board;
- the electronic device further comprises another shield part placed between the printed circuit board and the first part of the casing;
- the connecting element comprises a power connector and a data transmission connector; and
- the power connector and the data transmission connector are arranged so as to be wound around each other.

The different characteristics, variants, and embodiments of the invention may be combined with each other in various combinations insofar as they are not incompatible or exclusive of each other.

DESCRIPTION OF THE DRAWINGS

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

In the accompanying drawings.

It should be noted that in these figures, the structural and/or functional elements common to the different embodiments may have the same references.

DESCRIPTION OF EMBODIMENTS

Figure 1:
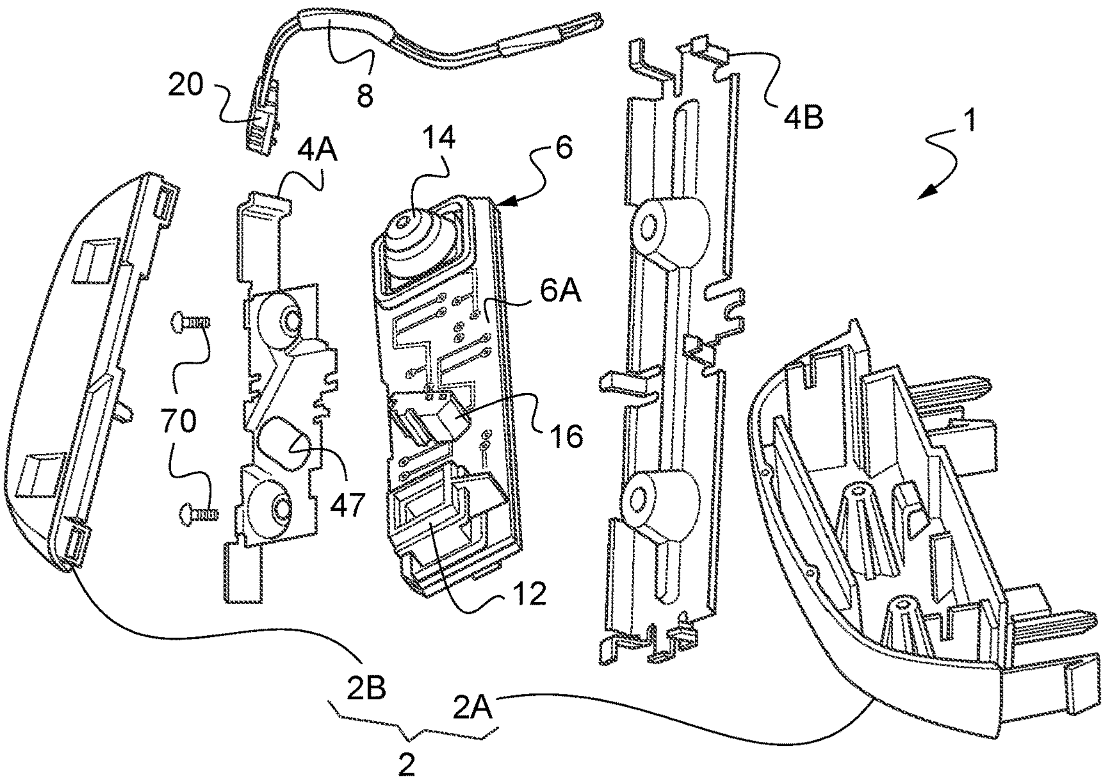
FIG. 1 is an exploded perspective view of an electronic device according to the invention.

FIG. 1 schematically represents an electronic device 1 according to the invention. The electronic device 1 comprises a casing 2, a shield part 4A, 4B, a printed circuit board 6 and a connecting element 8.

The electronic device 1 is configured to be placed in an automotive vehicle. The electronic device 1 is for example a Driver Monitoring System (or "DMS") installed in the automotive vehicle in order to monitor the driver of the automotive vehicle.

As represented in FIG. 1, the casing 2 comprises a first part 2A and a second part 2B. The casing 2 forms the envelope of a housing in which the different elements of the electronic device 1 are placed.

The casing 2 (i.e. the first part 2A and the second part 2B) is formed in an electrically insulating material. Each of the first part 2A and the second part 2B of the casing 2 is made in a monobloc piece. As an example, each of the first part 2A and the second part 2B is made of moulded plastic material.

The electronic device 1 also comprises at least one shield part 4A, 4B. This shield part 4A, 4B is configured to present a shielding function in order to enable the damping of the electromagnetic signals. More particularly, the shield part 4A, 4B allows protecting the printed circuit board 6 from the electromagnetic signals.

The shield part 4A, 4B is for example made of a metallic material and/or electrically conductive material. It is for instance made of aluminium.

As visible in FIG. 1, here, the electronic device 1 comprises a first shield part 4A and a second shield part 4B. The first shield part 4A and the second shield part 4B are here placed in order to sandwich the printed circuit board 6. In other words, here, the printed circuit board 6 is placed between the first shield part 4A and the second shield part 4B.

As an alternative, the electronic device can comprise only the first shield part if the printed circuit board has only one side components. In other words, the second shield part is optional in the electronic device according to the invention.

Figure 2:
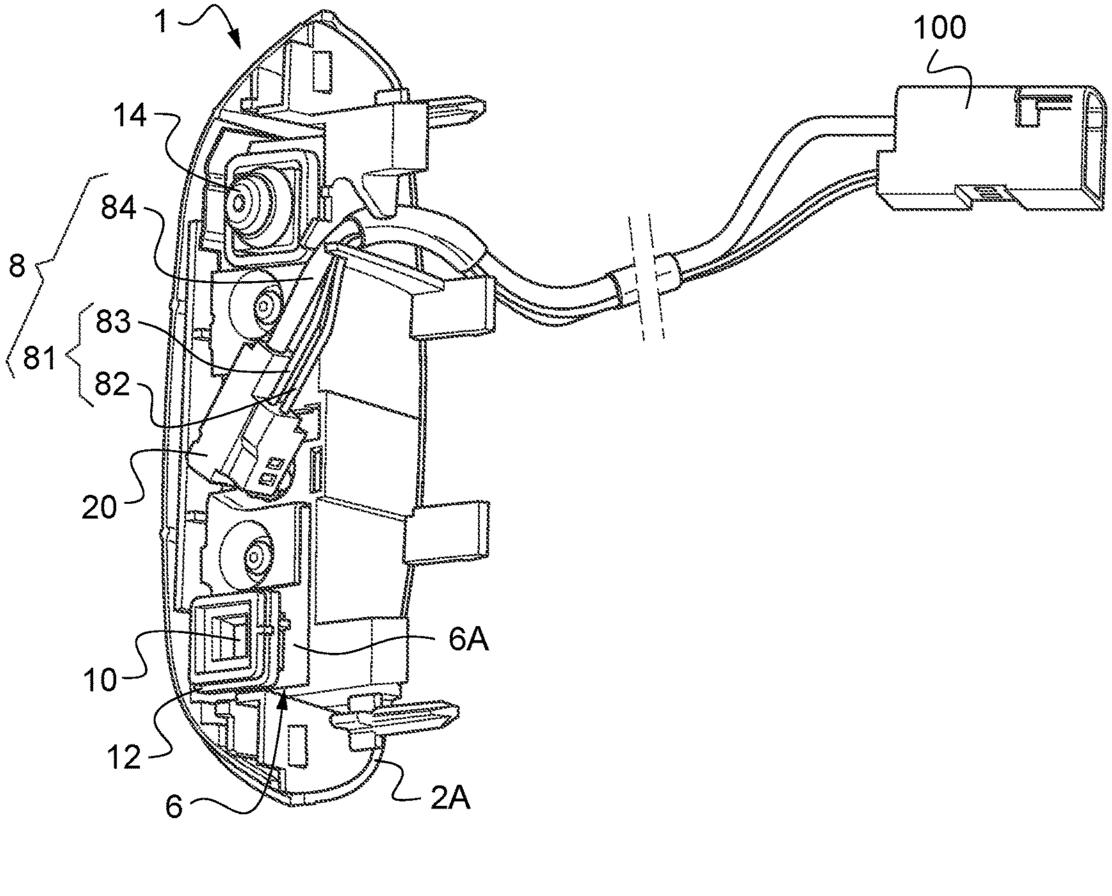
FIG. 2 is an assembled perspective view of the electronic device according to the invention.

The electronic device 1 also comprises the printed circuit board 6. The printed circuit board 6 comprises different electronical and optical elements in order to obtain the desired function of the electronic device 1. For example, if the electronical device 1 is a Driver Monitoring System, the printed circuit board 6 comprises a light source 10 (e.g. an infrared light source), a light reflector 12 and an optical sensor equipped with a lens 14 configured to acquire images (in the infrared range) of the driver of the automotive vehicle (FIG. 2).

The printed circuit board 6 also comprises a connector part 16 (FIG. 1). This connector part 16 is configured to electrically connect the printed circuit board 6. In practice, the connector part 16 comprises pins (for instance signal and ground pins) so as to allow the electrical connection of the printed circuit board 6.

Here, the connector part 16 protrudes from a surface 6A of the printed circuit board 6. As represented in FIGS. 1 and 2, the surface 6A is the surface of the printed circuit board 6 on which are mounted the light source 10, the light reflector 12 and the optical sensor equipped with the lens 14.

In practice, the printed circuit board 6 is placed between the first part 2A and the second part 2B of the casing 2. More particularly, the printed circuit board 6 is placed between the first shield part 4A and the first part 2A of the casing 2. Here, as represented in FIG. 1, the printed circuit board 6 is placed between the first shield part 4A and the second shield part 4B.

The electronic device 1 finally comprises at least one connecting element 8. The connecting element 8 is connected to the printed circuit board 6. More particularly, the connecting element 8 is connected to the connector part 16 of the printed circuit board 6. Here, the electronic device 1 comprises a power connector 81 and a data transmission connector 84.

The power connector 81 comprises for example a first component 82 allowing the electrical supply of the printed circuit board 6 and a second component 83 for grounding. The data transmission connector 84 is for example formed by a coaxial cable allowing the transmission of data between a processor located on the printed circuit board 6 and an intermediate element 100 connected to a control unit (not represented) of the automotive vehicle.

Advantageously here, as represented in FIG. 2, the power connector 81 and the data transmission connector 84 are arranged so as to be wounded around each other. As an example, the power connector 81 and the data transmission connector 84 can be intertwined.

This arrangement allows optimizing the occupied space in the casing 2. In other words, this arrangement enables to limit the space which is occupied in the casing 2. Finally, this arrangement allows using a smaller casing.

The connecting element 8 comprises a connectivity part, directly connected the printed circuit board 6 (and more particularly to the connector part 16 of the printed circuit board 6), and a fixing part configured to mechanically fix the connecting element 8 in the electronic device 1. The connectivity part is formed here by the power connector 81 and the data transmission connector 84.

The invention relates more particularly to the mechanical fixing of the connecting element 8. For that purpose, the connecting element 8 comprises a connecting head 20 configured to enable the mechanical fixing.

Figure 3:
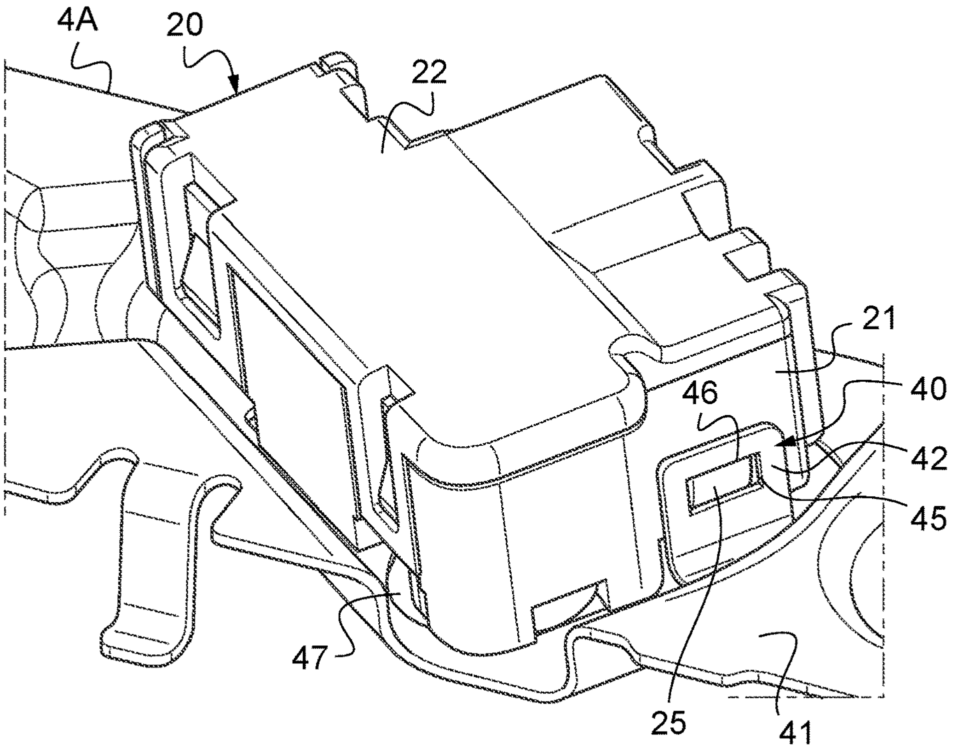
FIG. 3 represents a connecting head of a connecting element fixed on a shield part of the electronic device according to the invention.

As visible in FIG. 3, the connecting head 20 presents a parallelepiped shape with a top wall 22 and a side wall 21. This parallelepiped shape is opened on the opposite side of the top wall 22 in order to enable the connection to the printed circuit board 6.

The connecting head 20 is for example here made of moulded plastic material.

In order to enable the mechanical fixing of the connecting element 8, the connecting head 20 cooperates with a complementary fastening means 40 formed on the first shield part 4A. This cooperation is carried out in such a way that the connecting element 8 is fixed on the first shield part 4A. In other words, the connecting head 20 of the connecting element 8 is mechanically fixed on the first shield part 4A. The connecting head 20 thus forms the fixing part of the connecting element 8.

Advantageously according to the invention, the mechanical fixing of the connecting element 8 is carried out on the first shield part 4A, and not directly on the printed circuit board 6. The mechanical stresses are thus exerted on the first shield part 4A, so as not to weaken the printed circuit board 6.

In order to enable the connection between the connecting element 8 and the printed circuit board 6, the first shield part 4A comprises a connecting opening 47. This connecting opening 47 allows the access to the connector part 16 of the printed circuit board 6.

More particularly, the connector part 16 of the printed circuit board 6 protrudes through the connecting opening 47 in order to allow the connection between the connecting element 8 and the printed circuit board 6.

In other words, the connecting element 8 is connected to the printed circuit board 6 (more specifically to the connector part 16 of the printed circuit board 6) through this connecting opening 47. This connecting opening 47 allows the establishment of the connectivity part.

In practice, the cooperation between the connecting head 20 of the connecting element 8 and the complementary fastening means 40 is carried out by a snap-in cooperation.

For this purpose, as represented in FIG. 3, the complementary fastening means comprising a protruding part 42. This protruding part 42 protrudes from a surface 41 of the first shield part 4A, in an opposite direction of the printed circuit board 6 (when the printed circuit board 6 and the first shield part 4A are assembled).

Figure 4:
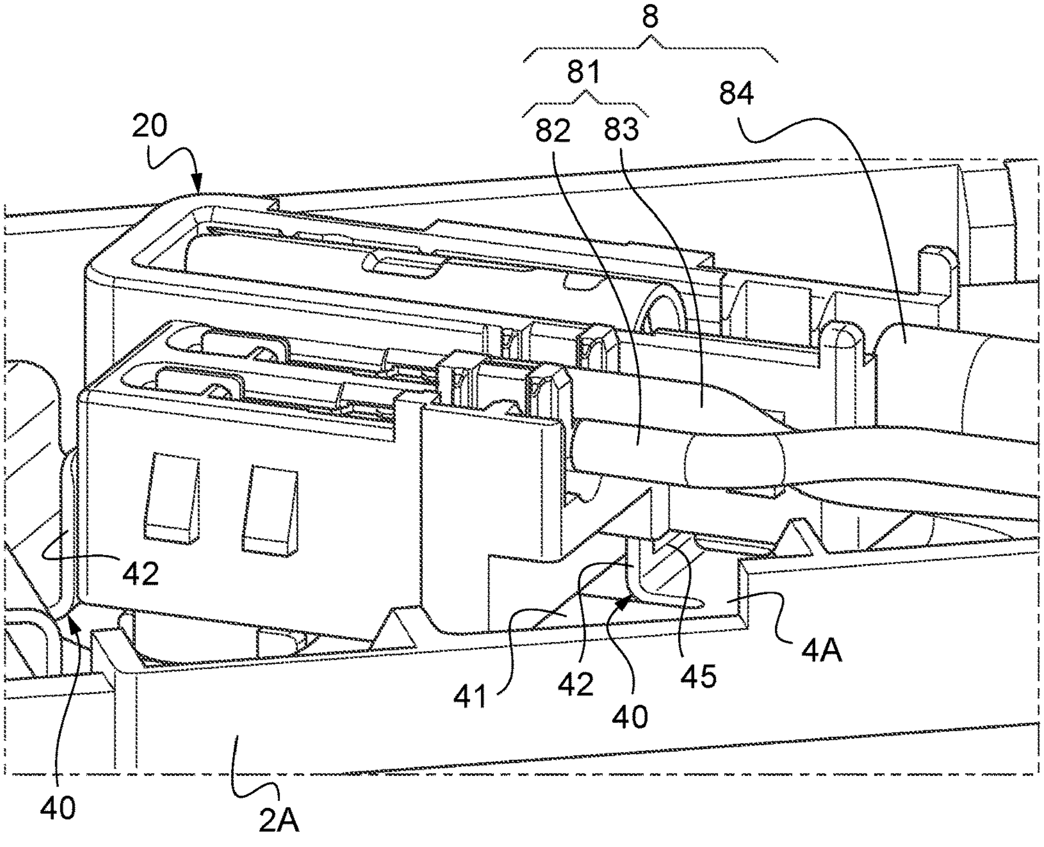
FIG. 4 represents a partial view of the connecting element comprised in the electronic device according to the invention.

As represented in FIG. 4, here, two opposite protruding parts 42 enable to fix the connecting head 20 on the first shield part 4A. Using two or more protruding parts enable to reinforce the mechanical fixing.

In order to carry out the snap-in cooperation between the connecting head 20 of the connecting element 8 and the complementary fastening means 40, the protruding part 42 comprises an opening 45. Here, the opening 45 presents a rectangular shape. As an alternative, this opening can be of any shape allowing the snap-in cooperation.

As visible in FIG. 3, the connecting head 20 comprises a tab 25 protruding from the side wall 21 of the connecting head 20 of the connecting element 8. The tab 25 is configured to be inserted in the opening 45 of the protruding part 42 of the complementary fastening means 40 in order to carry out the snap-in cooperation between the connecting element 8 and the complementary fastening means 40.

Here, one edge 46 of the opening 45 forms an abutment for the tab 25 of the connecting head 20, thus allowing the mechanical fixing of the connecting element 8 on the first shield part 4A.

Advantageously, the cooperation between the tab 25 and the edge of the opening allows securing the fixing of the connecting element 8 on the first shield part 4A.

In practice, the assembly of the electronic device 1 is performed as follows.

The first part 2A of the casing 2 is provided. The printed circuit board 6 is placed near this first part 2A of the casing 2. The first shield 4A is placed near the printed circuit board 6. In particular the printed circuit board 6 is arranged in such a way to be placed in front of the connecting opening 47 of the first shield part 4A.

The first shield part 4A and the printed circuit board 6 are then fixed to the first part 2A of the casing 2 with at least one screw 70. Here, two screws are used to fix the first shield part 4A and the printed circuit board 6 to the first part 2A of the casing 2.

The connecting element 8 is then connected to the printed circuit board 6. More particularly, the connecting head 20 is placed in front of the connecting opening 47 of the first shield part 4A, in order to enable the connection to the connector part 16 of the printed circuit board 6.

The connecting head 20 is snapped in the complementary fastening means 40 of the first shield part 4A. In other words, the tab 25 is inserted in the opening 45 in order to secure the mechanical fixing of the connecting element 8 on the first shield part 4A.

The second part 2B of the casing 2 is then clipped on the first part 2A of the casing 2 in such a way that the casing 2 houses the first shield part 4A and the printed circuit board 6. In other words, the second part 2B of the casing 2 forms a hood enclosing the first shield part 4A and the printed circuit board 6 in the casing 2.

In the alternative with the second shield part 4B, the assembly of the electronic device comprises positioning this second shield part 4B near the first part 2A of the casing 2, before placing the printed circuit board 6 near this second shield part 4B. The other steps are similar. It can we noticed that in that alternative, the first shield part 4A, the printed circuit board 6 and the second shield part 4B are screwed to the first part 2A of the casing 2.

The invention claimed is:

1. An electronic device comprising:

a casing comprising a first part and a second part;

a shield part;

a printed circuit board placed between the shield part and the first part of the casing; and at least one connecting element connected to the printed circuit board, wherein the connecting element comprises a connecting head cooperating with a complementary fastening means formed on the shield part, in such a way that the connecting element is fixed on the shield part, wherein the complementary fastening means comprises a protruding part protruding from a surface of the shield part, wherein the protruding part comprises an opening, and wherein the connecting head of the connecting element comprises a tab configured to be inserted in the opening to fix the connecting element on the shield part by a snap-in cooperation.

2. The electronic device according to claim 1, wherein the shield part comprises a connecting opening configured to connect the connecting element to a connector part of the printed circuit board, wherein the connector part extends through the connecting opening and allows the connection to the connecting element.

3. The electronic device according to claim 1, wherein the shield part and the printed circuit board are screwed to the first part of the casing.

4. The electronic device according to claim 1, wherein the second part of the casing is attached to the first part of the casing in such a way that the casing houses the shield part and the printed circuit board.

5. The electronic device according to claim 1, further comprising a second shield part, wherein the second shield part is placed between the printed circuit board and the first part of the casing.

6. The electronic device according to claim 1, wherein the connecting element comprises a power connector and a data transmission connector.

7. The electronic device according to claim 6, wherein the power connector and the data transmission connector are arranged so as to be wound around each other.

* * * * *